US012251020B2

(12) United States Patent
van der Heyden

(10) Patent No.: US 12,251,020 B2
(45) Date of Patent: Mar. 18, 2025

(54) SEATING ASSEMBLY FOR IMPROVED SEATING, ERGONOMIC CHAIRS OR WHEELCHAIRS

(71) Applicant: Superseating BVBA, Destelbergen (BE)

(72) Inventor: Bart van der Heyden, Destelbergen (BE)

(73) Assignee: SUPERSEATING BVBA, Destelberge (BE)

( * ) Notice: Subject to any disclaimer, the term of this patent is extended or adjusted under 35 U.S.C. 154(b) by 858 days.

(21) Appl. No.: 16/960,395

(22) PCT Filed: Jan. 9, 2019

(86) PCT No.: PCT/EP2019/050443
§ 371 (c)(1),
(2) Date: Jul. 7, 2020

(87) PCT Pub. No.: WO2019/137955
PCT Pub. Date: Jul. 18, 2019

(65) Prior Publication Data
US 2020/0352337 A1 Nov. 12, 2020

(30) Foreign Application Priority Data
Jan. 9, 2018 (EP) .................................... 18150823

(51) Int. Cl.
*A47C 1/024* (2006.01)
*A47C 1/022* (2006.01)
(Continued)

(52) U.S. Cl.
CPC .............. *A47C 1/024* (2013.01); *A47C 1/022* (2013.01); *A47C 1/0244* (2013.01);
(Continued)

(58) Field of Classification Search
CPC ....... A47C 3/0255; A47C 3/026; A47C 3/029; A47C 3/03; A47C 1/022; A47C 1/024;
(Continued)

(56) References Cited

U.S. PATENT DOCUMENTS

| | | | | |
|---|---|---|---|---|
| 2,606,595 A * | 8/1952 | Mednick | A47C 3/025 297/316 |
| 3,897,104 A * | 7/1975 | Black | A47C 3/02 297/118 |

(Continued)

FOREIGN PATENT DOCUMENTS

| | | | |
|---|---|---|---|
| EP | 0069410 A1 * | 1/1983 | A47C 7/024 |
| EP | 0296578 A1 | 12/1988 | |

OTHER PUBLICATIONS

International Search Report mailed Feb. 6, 2019, in reference to co-pending European Patent Application No. PCT/EP2019/050443 filed Jan. 9, 2019.

(Continued)

*Primary Examiner* — Robert Canfield
(74) *Attorney, Agent, or Firm* — Dinsmore & Shohl LLP

(57) ABSTRACT

The invention relates to a seating assembly (100) comprising a basic frame (101), a seat unit (102), and a back-support unit (103) wherein the seat unit and the back-support unit have a common pivoting axis (P) with respect to the frame at the level of the hip joint. Hence, based on human body like biomechanics and physiognomy, the seating assembly, particularly for ergonomic chairs or wheelchairs, provides a highly improved seating comfort, even with therapeutic effect.

12 Claims, 12 Drawing Sheets

(51) Int. Cl.

| | |
|---|---|
| ***A47C 3/025*** | (2006.01) |
| ***A47C 3/026*** | (2006.01) |
| ***A47C 3/029*** | (2006.01) |
| ***A47C 3/03*** | (2006.01) |
| ***A47C 7/44*** | (2006.01) |
| ***A61G 5/10*** | (2006.01) |

(52) U.S. Cl.
CPC .......... *A47C 3/0251* (2018.08); *A47C 3/0255* (2013.01); *A47C 3/026* (2013.01); *A47C 3/029* (2013.01); *A47C 3/03* (2013.01); *A47C 7/44* (2013.01); *A47C 7/446* (2013.01); *A61G 5/1056* (2013.01); *A61G 5/1081* (2016.11)

(58) Field of Classification Search
CPC ......... A47C 1/0244; A47C 7/44; A47C 7/446; A61G 5/1056; A61G 5/1081; A61G 5/1067; A61G 5/1075
See application file for complete search history.

(56) References Cited

U.S. PATENT DOCUMENTS

| | | | | | |
|---|---|---|---|---|---|
| 4,790,599 | A * | 12/1988 | Goldman | A47C 3/03 | 297/282 |
| 6,053,574 | A * | 4/2000 | Opsvik | A47C 3/026 | 297/303.2 |
| 6,149,236 | A * | 11/2000 | Brauning | A47C 7/443 | 297/301.1 |
| 6,450,578 | B1 * | 9/2002 | Taggett | A47C 7/72 | 297/423.38 |
| 2003/0230918 | A1 * | 12/2003 | Serber | A47C 1/022 | 297/301.1 |
| 2006/0103221 | A1 * | 5/2006 | Kleist | A47C 7/48 | 297/301.4 |
| 2006/0202535 | A1 * | 9/2006 | Heidmann | A47C 7/46 | 297/354.1 |
| 2007/0063559 | A1 * | 3/2007 | Chouinard | A47C 3/0255 | 297/271.1 |
| 2007/0194612 | A1 * | 8/2007 | Prieur | A47C 1/0244 | 297/312 |
| 2009/0261637 | A1 * | 10/2009 | Schmitz | A47C 3/026 | 297/217.2 |
| 2016/0296392 | A1 * | 10/2016 | Moller | A61G 5/10 | |
| 2017/0112289 | A1 * | 4/2017 | Wickett | A47C 7/563 | |
| 2020/0196760 | A1 * | 6/2020 | Chen | A47C 1/0355 | |
| 2022/0386776 | A1 * | 12/2022 | Paz | A61G 15/02 | |

OTHER PUBLICATIONS

European Search Report in reference to co-pending European Patent Application No. EP 18150823 filed May 6, 2018.

Belgian Extended Search Report to co-pending Belgian Patent Application No. BE 201905009 filed Sep. 1, 2019.

* cited by examiner

SEATING ASSEMBLY FOR IMPROVED SEATING, ERGONOMIC CHAIRS OR WHEELCHAIRS

CROSS-REFERENCES TO RELATED APPLICATIONS

This application is a national-stage application under 35 U.S.C. § 371 of International Application No. PCT/EP2019/050443, filed Jan. 9, 2019, which International Application claims benefit of priority to European Patent Application No. 18150823.5, filed Jan. 9, 2018.

TECHNICAL FIELD

The invention relates to a seating assembly for seating systems in general, though particularly for ergonomic chairs or wheelchairs providing an improved comfort and function in seating, decreasing fatigue based on human body physiological movements like pivoting movements, biomechanics and physiognomy.

BACKGROUND OF THE INVENTION

Standard chairs and wheelchairs have a 90° or close to vertical back-support versus seating structure, causing discomfort and fatigue when seating in such a structure since a person sitting in such chair or wheelchair is either too vertical, too much leaning forward, having its body collapsed, or else the person is leaning backward and sliding forward in excess, shifting the body forward in a saggy position. Improvement exists although in providing a back-support and seating being adaptable in position via a variable inclination angle and hinge point, whereas seating units can be tilted up or down via such hinge point. Seating discomfort remains however, even with such improvement, while the human body is still forced in an unnatural and often tensed position. With such inclinable back-support, the person's body is pressed forward, or stretched out. Current tilting seats keep causing inevitable load and stress on the muscles and skin tissue. Further improvement, particularly following the natural human body movements and structural mechanism is therefore required.

Comparable remarks and/or conclusions can be made in the field of seating systems in general, or with respect to ergonomic chairs, amongst which for instance office chairs, although presenting possibly movable or even 2-part back-supports according to the art, not satisfying enough in seating comfort due to a persistent unsmooth posture.

There is a clear need in providing an improved seating assembly for improved seating systems in general, particularly for ergonomic purposes and/or wheelchair applications.

AIM OF THE INVENTION

The aim of the invention is to provide an improved seating assembly, particularly for ergonomic chairs or wheelchairs, possibly even with therapeutic purposes.

SUMMARY OF THE INVENTION

In a first aspect of the invention a seating assembly is provided, comprising a basic frame or seat base unit, a seat unit, and a back-support unit wherein both the seat unit and the back-support unit have a common pivoting axis with respect to the seat base unit at the level of the hip joint or the trochanter point. This common pivoting axis is for instance parallel with the basic frame floor platform or ground, while being e.g. perpendicular to side faces (as e.g. defined by armrests) of the seating assembly. The seat unit itself may comprise a seat frame and seat or sitting, whereas the back-support unit is for example also a 2-part structure with a back-support frame and a backrest at a certain angle with the normal axis defined as being perpendicular to the basic floor platform or ground. The basic frame or seat base unit can be different architectures, such as e.g. platform alike, or else T-structure alike depending on the application, or even provided onto wheels in case of a wheelchair.

The seat unit and the back-support unit are mounted onto the basic frame or seat base unit. Moreover, seat unit and back-support unit may be connected to frame or seat base unit by means of a pair of opposed pivot points at the level of the hip joint, and lying on the common pivoting axis at each armrest side of the seating assembly. The level of the hip joint may range between 3 cm and 20 cm above the seat unit, preferably between 5 cm and 15 cm above the seat unit. Moreover, this hip joint level may range between 10 cm and 35 cm distance from the back of the seat, preferably between 15 cm and 30 cm. According to an embodiment, the seat unit and back-support unit are pivotable forward or backward around the common pivoting axis with respect to the frame or seat base unit.

The seating assembly may further comprise motion control means for controlling a pivoting movement of the seat unit and/or the said back-support unit with respect to frame or seat base unit, while connecting all units with each other, and wherein the pivoting movement being enabled by means of a force exerted on the seating assembly. Generally this force is executed while seating, but it also possible to elaborate force otherwise, e.g. someone pushing on the chair or by means of a (remote) control button when the seating assembly is provided with automated steering and control. In other words, the ergonomic chair or wheelchair can be motorized, such that the force is not necessarily executed by human interaction (only) but may be (partially) performed in an automated manner. Depending on the type and amount of force, the pivoting movement may differ.

Several pivoting movements are possible, in for example only tilting the back-support, or only moving the seat up or down, or pivoting the entire seating assembly structure. Motion control means can be open (free) or locked to allow or block one or more of the pivoting movements, and/or to fix or unfix seating assembly units from each other. In case of fixing or attaching units for example, these units will pivot together as one single entity instead of further moving independently. The motion control means are for example a gas spring, a damper or an actuator such as e.g. a pneumatic cylinder. Further, the motion control means may be pure mechanical or either electronically controlled. Motion control means can also be semi-open or semi-locked, meaning that a dynamic control can be foreseen, and hence for instance an actuator with variable damping, being installed or regulated e.g. as partially damped, can be used to control the pivoting movement. According to an embodiment, the actuators are gas springs provided with damping and stop function, comprising of different resistances. Moreover, the actuators can be electrically controlled. According to an embodiment, the actuators are made of deformable materials such as for instance polymers. In an embodiment, at least one end of the motion control means is lying on respective radius of the pair of opposed pivot points, or parallel therewith. This radius can also be determined as the radius of the circle with its centre in the hip joint or trochanter point.

The pivoting movement of seat unit and said back-support unit can be independently, or these units can be pivoted in a combined manner. Moreover, one or both of them can be temporarily excluded from being pivotable, which can be controlled by means of locking one of the motion control means. According to an embodiment, such pivoting movement around the common pivoting axis can be interpreted as real, i.e. the actual movement takes place at pivoting points on the pivoting axis. However, according to another embodiment, this pivoting movement can also be accomplished in a virtual manner, meaning that the motion control means are configured to enable pivotable movements of the seat unit and bock support unit wherein the pivoting centre is defined by the hip joint or trochanter point, such as for example that the actual movement takes place on a circular guiding rail of which the circle centre is defined by the hip joint or trochanter point. Hence, the seating assembly may comprise guiding rails, for example embedded in the basic frame or seat base unit, for further controlling the pivoting movement.

In a second aspect of the invention a pivoting mechanism is provided for a seating assembly in accordance with first aspect of the invention, comprising the steps of (i) pivoting the seat unit and the back-support unit both together forward or backward with respect to the frame or seat base unit by means of a first motion control means, (ii) pivoting only the seat unit forward and backward with respect to the frame or seat base unit by means of the first motion control means, and (iii) pivoting only the back-support unit forward or backward with respect to the frame or seat base unit by means of a second motion control means. The steps as mentioned above may appear in this order, or in a different order. In fact, it is not always necessary to have a particular order, although all of the steps can occur randomly, at different times, and multiple times. It is further possible that some of the steps are taking place simultaneously, or that they overlap in some way. According to an embodiment, the pivoting mechanism may further comprise the step of (iv) pivoting the seat unit forward or backward with respect to the frame or seat base unit, wherein the back-support unit is in fixed position, by means of a third motion control means.

In a third aspect of the invention an ergonomic chair is provided comprising a seating assembly in accordance with first aspect of the invention. Applications in automotive such as for instance a car seat can be mentioned, as well as office chairs, or working chairs, or a stool in the field of furniture, office equipment and/or working environment infrastructure. It is noted that in case of a stool or tabouret, the back-support unit may be absent. According to an embodiment, the seat unit is provided with a deformable cover, sheet or fabric, which changes or adapts in shape in accordance with the movement that is generated. This way, further seating comfort can be introduced while the seat is better connected to the person sitting therein, meaning that pressure points are further reduced. As an example, foam material or a deformable elastomer could be used for such seat cover.

In a fourth aspect of the invention a wheelchair is provided comprising a seating assembly in accordance with first aspect of the invention. It is noted that wheels and axes need particular design and adaptation in accordance with the seating assembly's features of the invention, although these wheels and axes do not essentially take part of the invention.

DETAILED DESCRIPTION OF THE INVENTION

The origin of the invention is related to transforming hinges and rotations of the human body into pivoting movements within a seating system, eventually creating a dynamic and innovative chair or seating assembly in general with ergonomic purposes in particular. Pressure points, skin integrity issues, blocked muscles, a sliding body, shear forces and tense and non-functional posture are reduced or even eliminated with the improved seating assembly in accordance with the invention. Further, the invention is challenged while translating such ergonomic and physiognomic system in a well-designed (wheel) chair, wherein all functions are integrated in an esthetically nice looking and apparently simple though rather subtle and very practical model. A solution is provided for both satisfying user and environment.

Figure 1A:
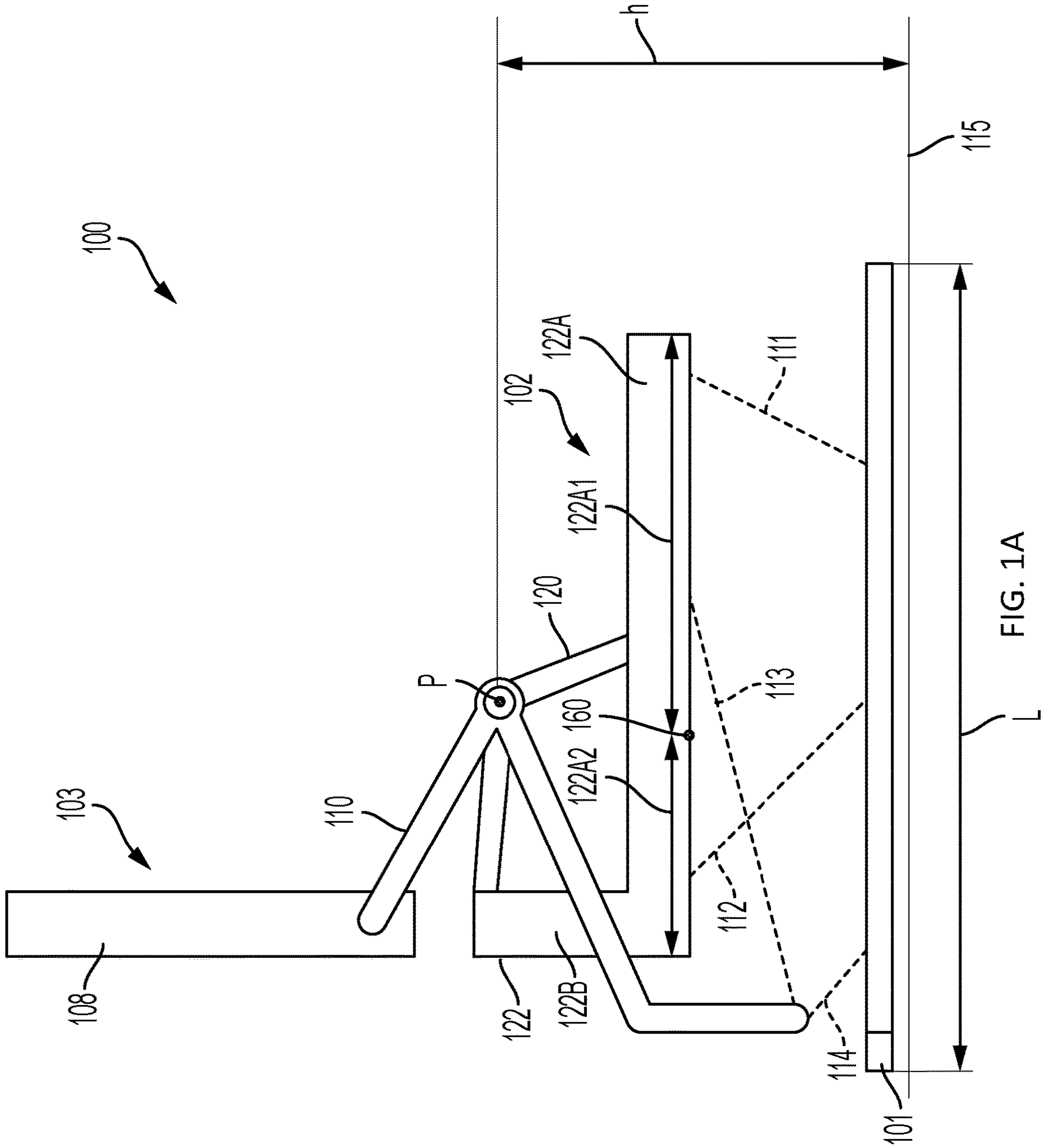
FIG. 1A illustrates schematically an embodiment of the functional principle of a seating assembly in accordance with the invention.

With FIG. 1A an embodiment of the functional principle of a seating assembly 100 in accordance with the invention is presented schematically. The seating assembly 100 as depicted here comprises a basic frame or seat base unit 101 onto which a seat unit 102 and a back-support unit 103 are mounted. The basic frame 101 in FIG. 1A is positioned with its length L parallel to the floor 115, or so-called set up horizontally. The seat unit 102 itself comprises of a seat or sitting 122 and a seat frame 120, whereas the back-support unit 103 has a backrest 108 mounted onto a back-support frame 110. Both seat frame 120 and back-support frame 110 are connected with the hip joint or trochanter point lying on the axis P perpendicular to the drawing surface, i.e. the surface of FIG. 1A. The hip joint or trochanter point is a pivot point at the level of the hip joint, also referred to as height h. This height h can vary and is for instance in the range of 50-60 cm or about 55 cm.

Further, both seat unit 102 and back-support unit 103 are connected with motion control means 111, 112, 113, 114 such as for example gas springs or dampers, or actuators. As the word suggests these motion control means 111, 112, 113, 114 are provided to control movement between the main parts of the seating assembly 100. More in particular, a first type of motion control means 111, 112 is shown connecting the sitting 122 with the basic frame 101, and enabling a pivoting movement from front to back via means 111, and a pivoting movement from back to front via means 112. The motion control means 111, 112 hence control the seat unit 102 to tilt forward and backward. The first type motion control means 111, 112 can be locked or open. When locked, the seat base position or position of the sitting 122 remains fixed. When open, the seat base position or position of the sitting 122 can be changed or can adapt to the movement and/or muscle tone and/or position of the user. i.e. a person sitting on the seating assembly 100. The motion control means 111, 112 may come in pairs i.e. having one piece at one or each side of the seating assembly 100, as better illustrated while referring to gas springs 105, 105', 106, 106', or first pair 105, 105' and second pair 106, 106' in FIG. 1C.

A second type means 113 between seat unit 102 and back-support unit 103 will control movement of the back-support unit 103, more in particular controlling the backrest 108 for reclining backward and pivoting back forward. The second type motion control means 113 can also be locked or open. When locked, the backrest 108 position will remain fixed. When open, the backrest 108 position can be changed or can adapt to the movement and/or muscle tone and/or position of the user or person sitting on the seat.

A third type means 114 between back-support unit 103 and basic frame 101 is provided for controlling fixation of the back-support unit 103 while maintaining a variable seat tilt, meaning controlling pivoting movement of the seat unit 102 while being fixed to the back-support unit 103. Again, the third type motion control means 114 can be locked or open. When locked, the backrest 108 position remains fixed while the seat unit 102 can vary positions independently by means of second type motion control means 113 open, and variation of first type motion control means 112, 111 (open or locked) for variations in seat unit 102 position. When open, back-support unit 103 and seat unit 102 movement can occur in conjunction providing seat and back-support tilt in space, with second type motion control means 113 locked and first type motion control means 112, 111 open or locked for variations in seat unit 102 and back-support unit 103 together (tilt in space).

As shown in FIG. 1A, the seat unit 102 or sitting 122 in particular comprises of a horizontal or sitting section 122A and a vertical or back section 122B. In other words, the seat unit 102 covers sitting including pelvis area. Referring in particular to the seat unit 102 comprising seat and pelvic support, according to an embodiment of the invention, it is possible to adjust the seat-to-pelvic angle defined as being the angle between the seat and the direction of pelvis as illustrated in FIG. 8, for example by means of Velcro® Brand tape (a hook and loop fastener tape by Velcro Companies) for example in a wheelchair or another mechanism all or not controlled by means of an actuator.

Figure 8B:
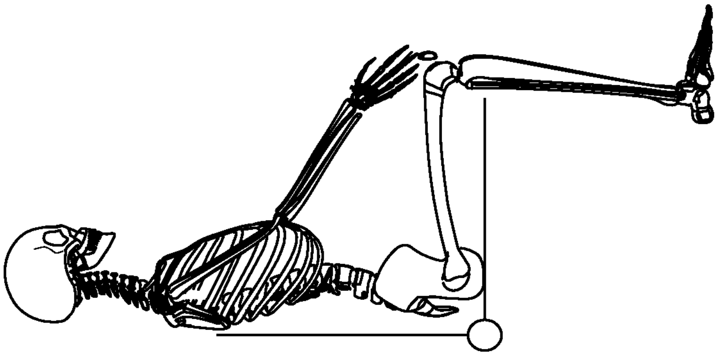
FIGS. 8A and 8B illustrate a person leaning backward (FIG. 8A) or sitting straight up (FIG. 8B), for clarifying the seat-to-pelvic angle as defined with the invention.
Figure 8A:
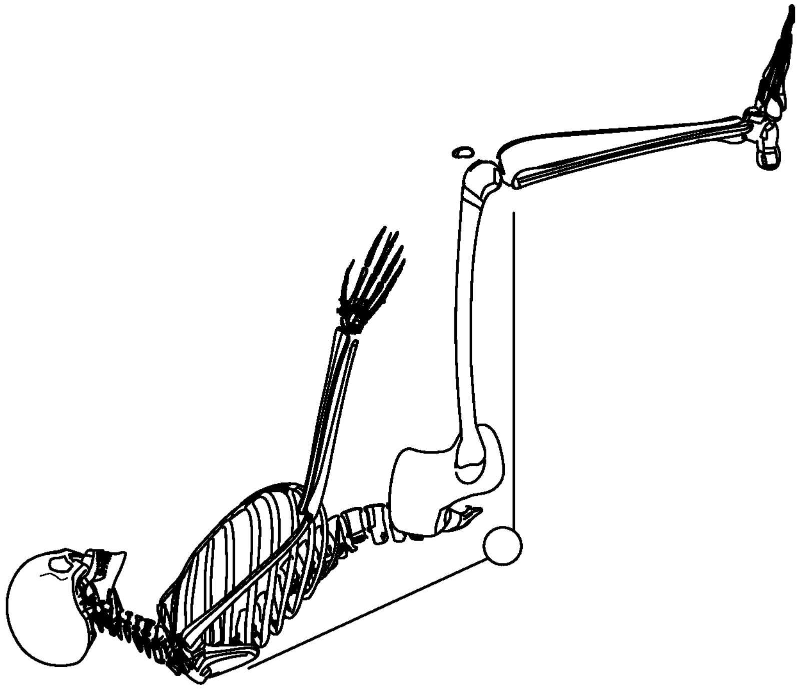

In FIGS. 8A and 8B the seat-to-pelvic angle is indicated with 2 straight lines and a connecting elliptical hinge therebetween. In FIG. 8A a person is leaning backward and hence the seat-to-pelvic angle is more than 90°, whereas in FIG. 8B the person is sitting straight up, and therefore the seat-to-pelvic angle is about 90°. In some occasions the seat-to-pelvic angle for (wheelchair) seat users may be fixed of limited in adjustment and therefore it may be necessary to be able to adjust it. For example, this is possible by sliding a bracket on the seat assembly frame and adjusting the tension of Velcro® Brand tape (a hook and loop fastener tape by Velcro Companies) provided onto the (wheelchair) seat such that movement of the pelvis can be followed. Moreover, this can be done by means of another mechanism to adjust the angle (at the height of the elliptical hinge in FIGS. 8A and 8B) and can also be performed by means of an actuator.

The back-support unit 103 covers lumbar and dorsal area. Hence, segmentation around anatomical movement axes is generated, which is further clarified as follows. With the present invention a seating assembly can be divided into specific parts or segments, wherein the well-chosen segments are for the correct and particular functioning of the seating assembly. According to an embodiment, following parts or segments, some elements thereof, or a combination of such elements, are particularly chosen for the seating assembly in accordance with the invention:

- Sitting 122A and pelvis part 122B of the seat unit 102, which can be defined as the horizontal seat and the back section only at the height of the back of the pelvis;
- The back-support unit 103, defined as the back section above the back of the pelvis.

Moreover, the seat unit 102 with sitting 122A and pelvis part 122B can be further segmented as:

- Partial sitting 122A1, defined as the horizontal seat, taken from the back section though only up to the sitting knob 160 or ischial tuberosity, located at about ⅓ seat distance from the back section, including the back section or pelvis part 122B;
- Partial sitting 122A2, defined as the remaining ⅔ seat distance of the horizontal seat;
- Left and right split-up parts of all of the above seat unit segmentations, being individually operable.

In addition, the back-support unit 103 can also be further segmented as:

- Left and right split-up parts of all of the above back-support unit segmentations, being individually operable.

With the left and right split-up parts, asymmetric operation or movement of the seating assembly is feasible, such that people suffering for instance from hemiplegia or scoliosis can be particularly supported or accommodated in improved sitting comfort and alignment.

All of mentioned above parts or segments can either all move together, either independently or in sequence of each other around the hip joint (virtual or real) for an anatomical movement, and can independently from each other or together or in sequence, move dynamically (automatically) or statically (adjustable in a fixed manner). Such movement can be effected by different types of actuators (e.g. gas springs, polymers, motors), control systems (e.g. sensors, user pressure on segments, user movements) and operating systems (e.g. buttons, levers, electrical control). Depending on whether these parts or segments can either all move together, separately or in sequence, different sitting functions will be applicable.

Figure 1B:
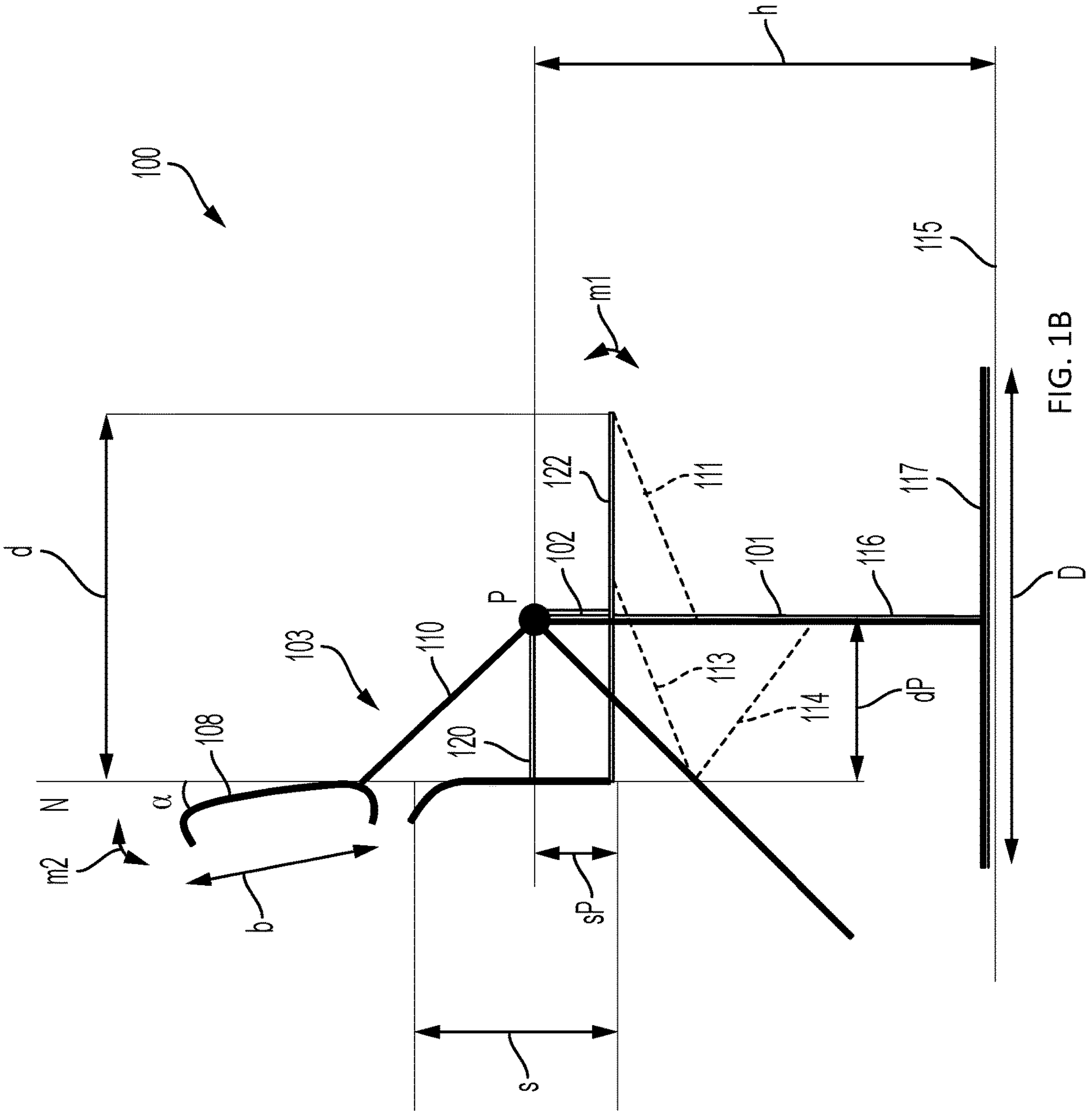
FIG. 1B illustrates schematically another embodiment of the functional principle of a seating assembly in accordance with the invention

Whereas in FIG. 1A the basic frame of seat base unit 101 is set up horizontally within the drawing. FIG. 1B illustrates schematically another embodiment of the functional principle of a seating assembly in accordance with the invention, wherein the seat base unit 101 appears to be set up rather vertically with respect to the floor or ground 115. In fact, the double-lined seat base unit 101 of FIG. 1B is determined as having a first vertical part 116 perpendicular to a second horizontal part 117, with the first vertical part 116 also being perpendicular to the ground 115. The second horizontal part 117 of the T-structured seat base unit 101 is placed parallel with the floor 115.

Further, in FIG. 1B only one first type motion control means 111 is given for illustrating pivoting movement from front to back, while connecting the seat unit 102 in bold grey with the seat base unit 101. The seat unit 102 is again also connected with the back-support unit 103 in bold black via second type motion control means 113 for controlling backrest 108 movement, as well as is provided a third type motion control means 114 between the back-support unit 103 and the seat base unit 101 for controlling sitting 122 movement while being fixed to the back-support. All motion control means 111, 113, 114 are represented in dashed line.

The backrest 108 represents an angle α with the normal N being perpendicular to the ground 115. Moving the backrest 108 via motion control means 113 will change the angle α with the normal N. The position of the backrest 108 can hence be adapted with a person reclining in the seating assembly. While reclining, the angle α will increase, and decrease again when the person is leaning back forward. The arrows m1 and m2 indicate possible pivoting movements. As an example, measures of the seating assembly are for instance, for a height h of approximately 55 cm, having a horizontal part 117 of about 60 cm in length D, a seat depth d of ca. 45 cm, of which the distance to pivot point dP is ca. 20 cm, while seat height s is about 25 cm, of which the height to pivot point sP is about 10 cm. Height h can vary for instance in office chair applications. Further, all measures mentioned may vary depending on biometrical variations within user populations. With dP as defined here it becomes clear that the pivot point doesn't need to be centred with respect to the seat unit 102, but moreover is lying closer towards the backrest 108 than to the front of the sitting 122. In addition, for this particular example, the length b of the backrest 108 is e.g. 20 cm positioned at an angle α of e.g. 10° with the normal N.

Figure 1C:
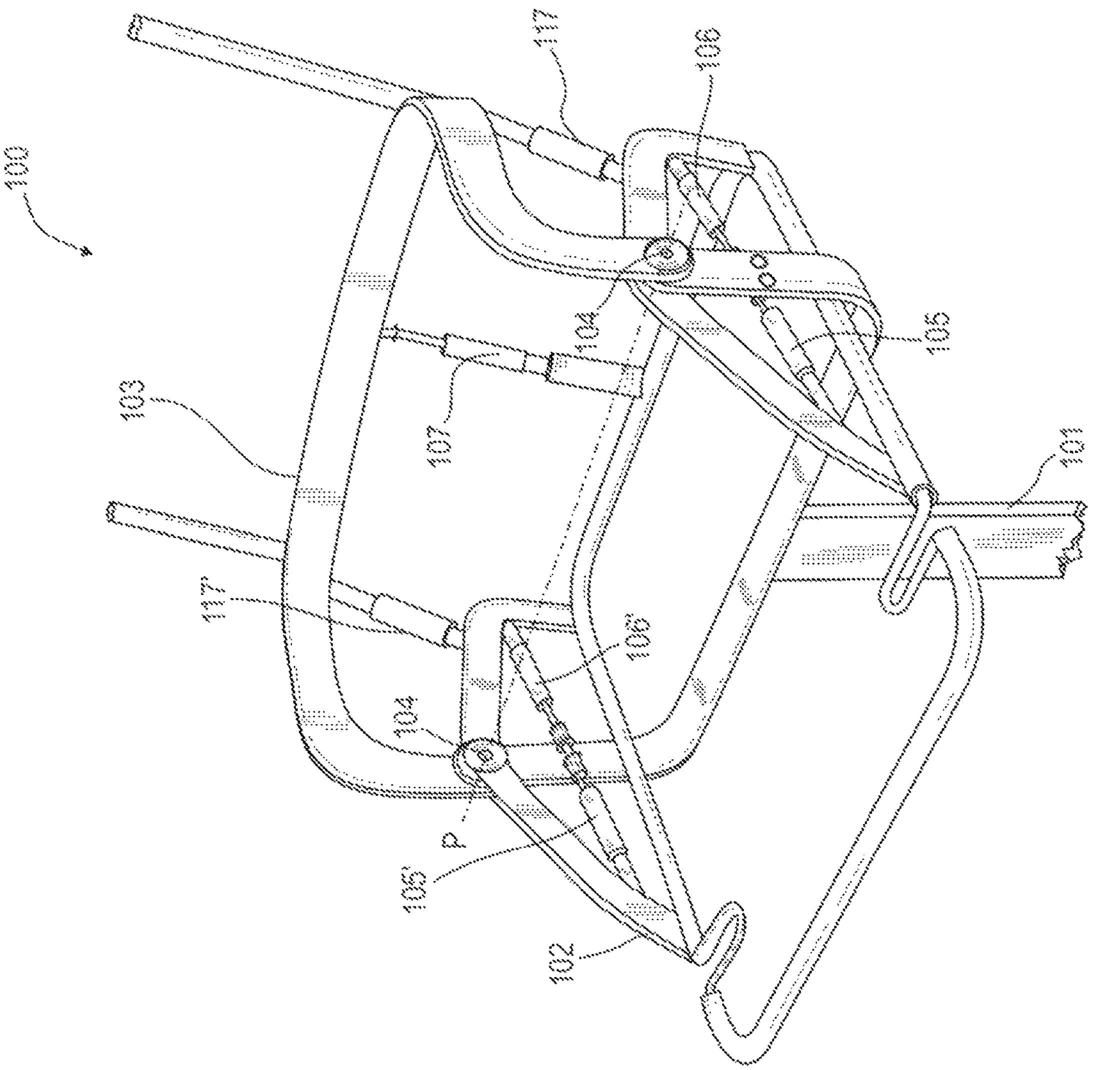
FIG. 1C shows an embodiment of part of an ergonomic chair design in accordance with the invention.

FIG. 1C shows an embodiment of part of an ergonomic chair design as seating assembly 100 in accordance with the invention. Part of the seat base unit 101 is shown, onto which the seat unit 102 and the back-support unit 103 are mounted via the same pair of pivot points 104 lying on the common pivoting axis P. The first type motion control means for pivoting the seat unit 102 forward and backward are represented here by gas springs 105, 105', 106, 106', or first pair of gas springs 105, 105' and second pair of gas springs 106, 106', while connecting seat unit 102 with seat base unit 101. Using other (type of) actuators instead of gas springs is also possible here. The second type of motion control means, for controlling pivoting movement of the back-support unit 103, is now illustrated by gas spring 107, while connecting seat unit 102 with back-support unit 103. As an alternative to gas spring 107, the connection and pivoting movement between seat unit 102 and back-support unit 103 may also be introduced via a pair of motion control means, and therefore gas springs 117, 117' are displayed as another possible solution.

Figure 1D:
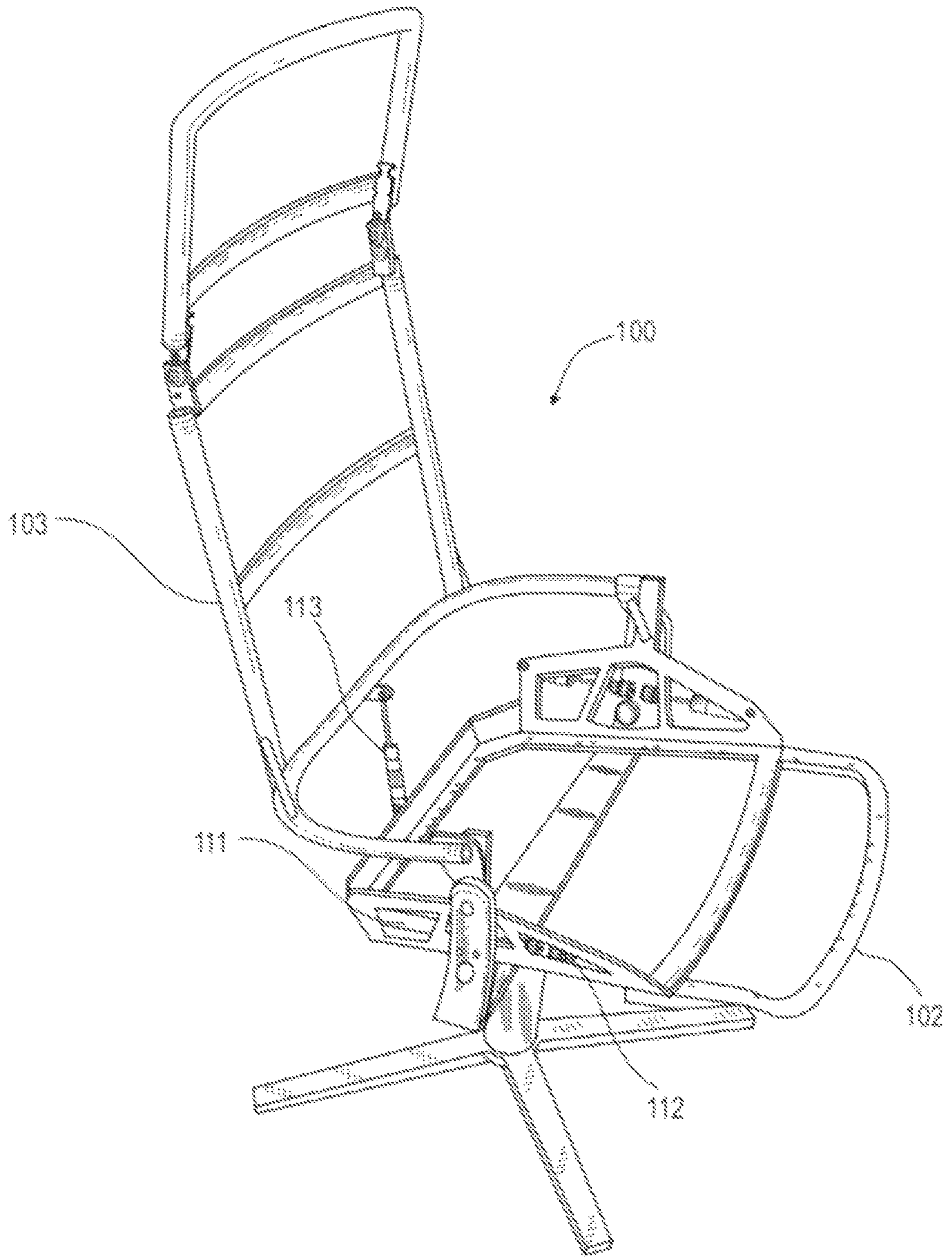
FIG. 1D shows an embodiment of an ergonomic chair prototype in accordance with the invention.

In FIG. 1D a picture embodiment is given of an ergonomic chair prototype as seating assembly 100 in accordance with the invention. The first type of motion control means 111, 112 are clearly illustrated on each side of the chair. The second type of motion control means 113 is here an actuator connecting seat unit 102 with back-support unit 103. With this embodiment of FIG. 1D, as with the embodiment of FIG. 1C, the option of fixing the back-support unit 103 is no longer provided. In other words, the third type of motion control means 114 is not presented in these ergonomic chair examples. For non-medical applications this might be acceptable, whereas in wheelchairs or complex seating configurations for instance—having a medical purpose—the third type of motion control means 114 would be rather preferred.

Figure 1E:
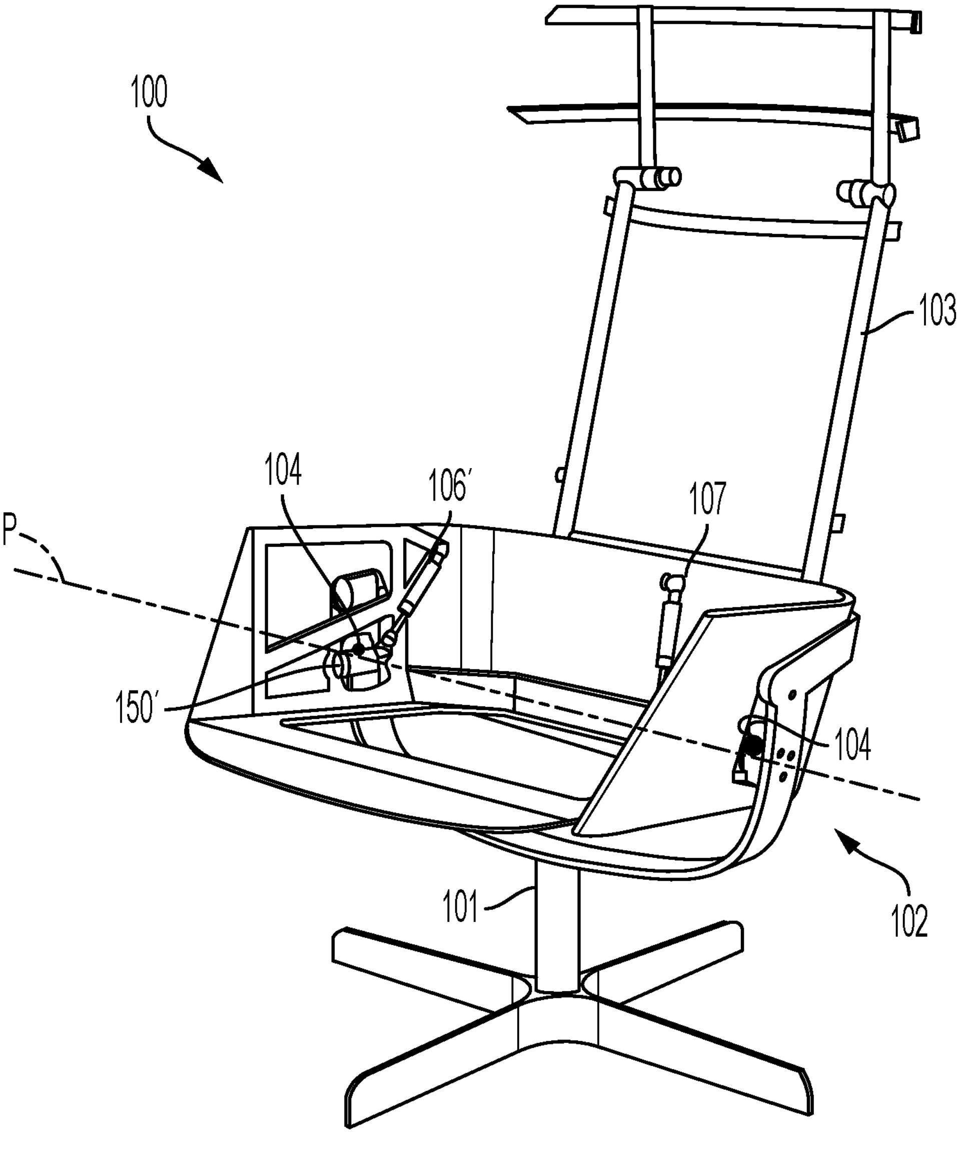
FIG. 1E shows an embodiment of an ergonomic design chair in accordance with the invention.

In FIG. 1E an embodiment is illustrated of an ergonomic design chair comprising a seating assembly 100 in accordance with the invention. The seat base unit 101 is shown, onto which the seat unit 102 and the back-support unit 103 are mounted via the same pair of pivot points 104 lying on the common pivoting axis P. As in FIG. 1C, gas springs 106', 107 (including gas spring 106 not visible) are also present here for motion control of seat unit 102 and back-support unit 103. In this embodiment the gas spring 105' at the right inner chair side (including gas spring 105 at the left inner chair side) from FIG. 1C is replaced by another type of actuator 150' (and a corresponding actuator paired with gas spring 107 and not visible) in FIG. 1E, being for example a deformable polymer. In particular, this type of actuator is used instead of a gas spring because the little amount of change or scale in movement needed or required here for this kind of chair design. As said, although not visible in FIG. 1E, the corresponding actuator that replaces the gas spring 105, is also for example a deformable polymer. The deformable polymer is e.g. smaller in size or volume than the gas spring 105, 105' miniaturizing and simplifying the motion control system provided within the chair design.

Figure 2C:
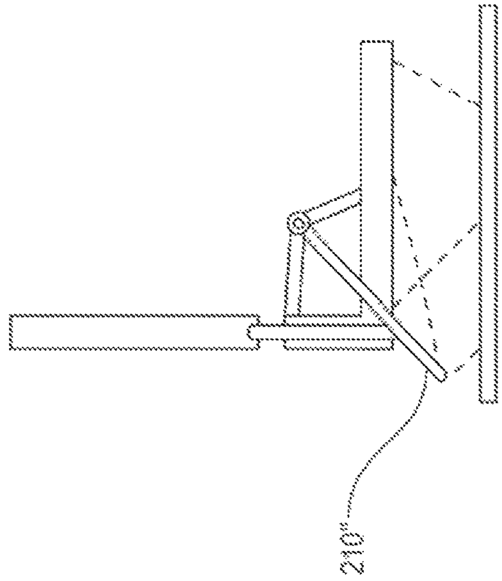
FIGS. 2A, 2B, and 2C illustrate alternative embodiments of the functional principle of the seating assembly of FIG. 1A, representing other back-support frame architectures.
Figure 2B:
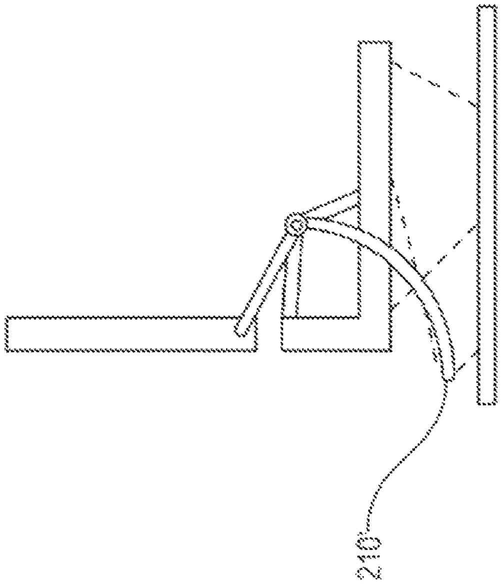
Figure 2A:
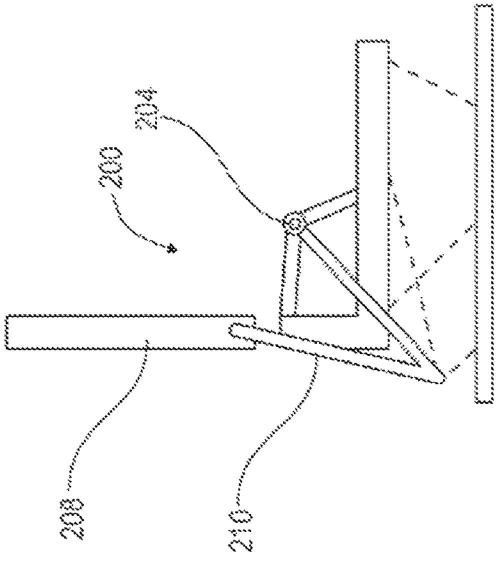

FIGS. 2A, 2B, and 2C illustrate alternative embodiments of the functional principle of the seating assembly 100 of FIG. 1A, representing other back-support frame architectures. As depicted in FIGS. 2A and 2C, the back-support frame 210, 210" of the seating assembly 200 is not necessarily directly connecting the backrest 208 with the hip joint or trochanter point 204. Indirect connection with the trochanter point 204 for different seating applications is herewith illustrated. Further, the back-support frame 210' can be partially curved as illustrated in FIG. 2B.

Figure 3B:
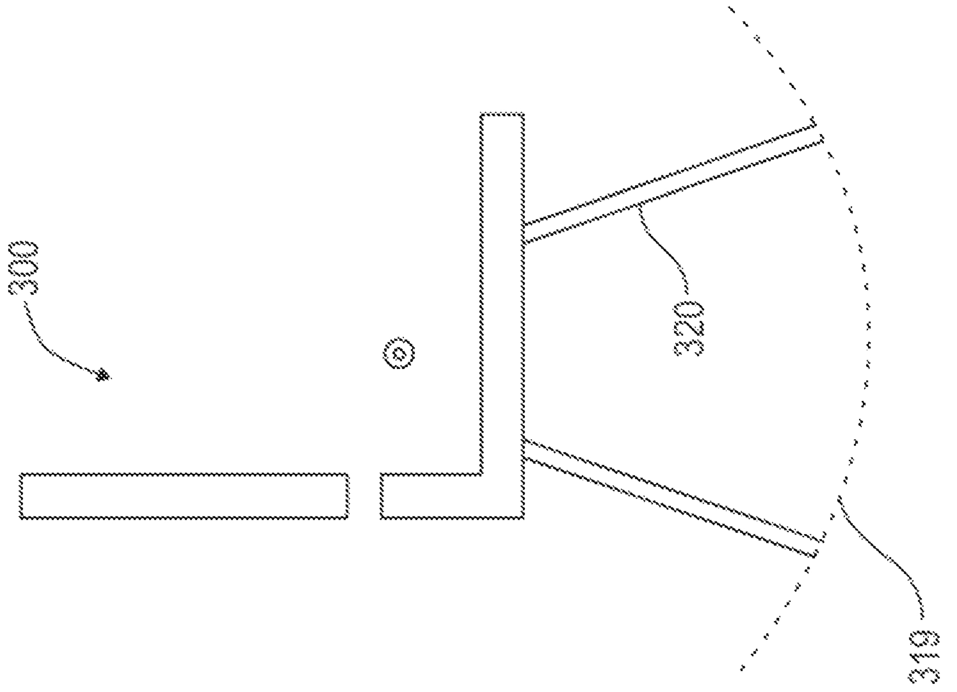
FIG. 3B illustrates an embodiment for connecting the seating assembly's seat frame with the hip joint in a virtual way in accordance with the invention.
Figure 3A:
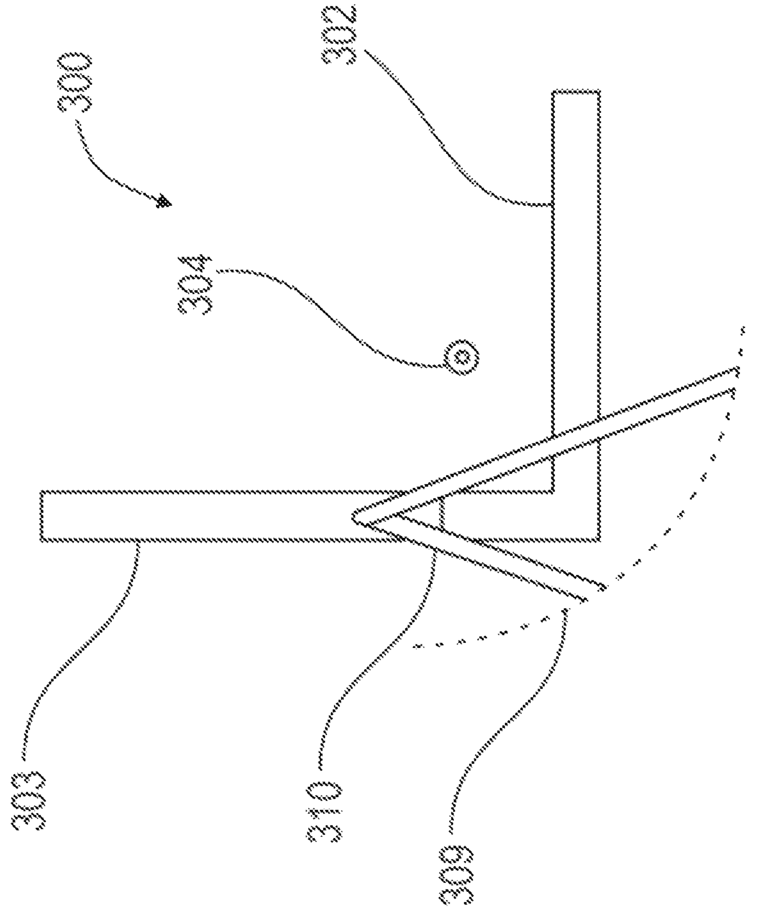
FIG. 3A illustrates an embodiment for connecting the seating assembly's back-support frame with the hip joint in a virtual way in accordance with the invention.

While referring to FIGS. 3A and 3B, according to the invention, it is also possible to connect the seat unit 302 and the back-support unit 303 with the hip joint or trochanter point 304 in a virtual manner, i.e. connecting the units 302, 303 respectively with a circular guiding rail 309, 319 of which the centre is the hip joint or trochanter point 304. FIG. 3A illustrates an embodiment for connecting the seating assembly's back-support unit 303, more in particular its back-support frame 310 with the hip joint 304 in a virtual way via the guiding rail 309, while FIG. 3B shows an embodiment for connecting the seating assembly's seat unit 302, more in particular its seat frame 320 with the hip joint 304 in a virtual way via the guiding rail 319.

Figure 4:
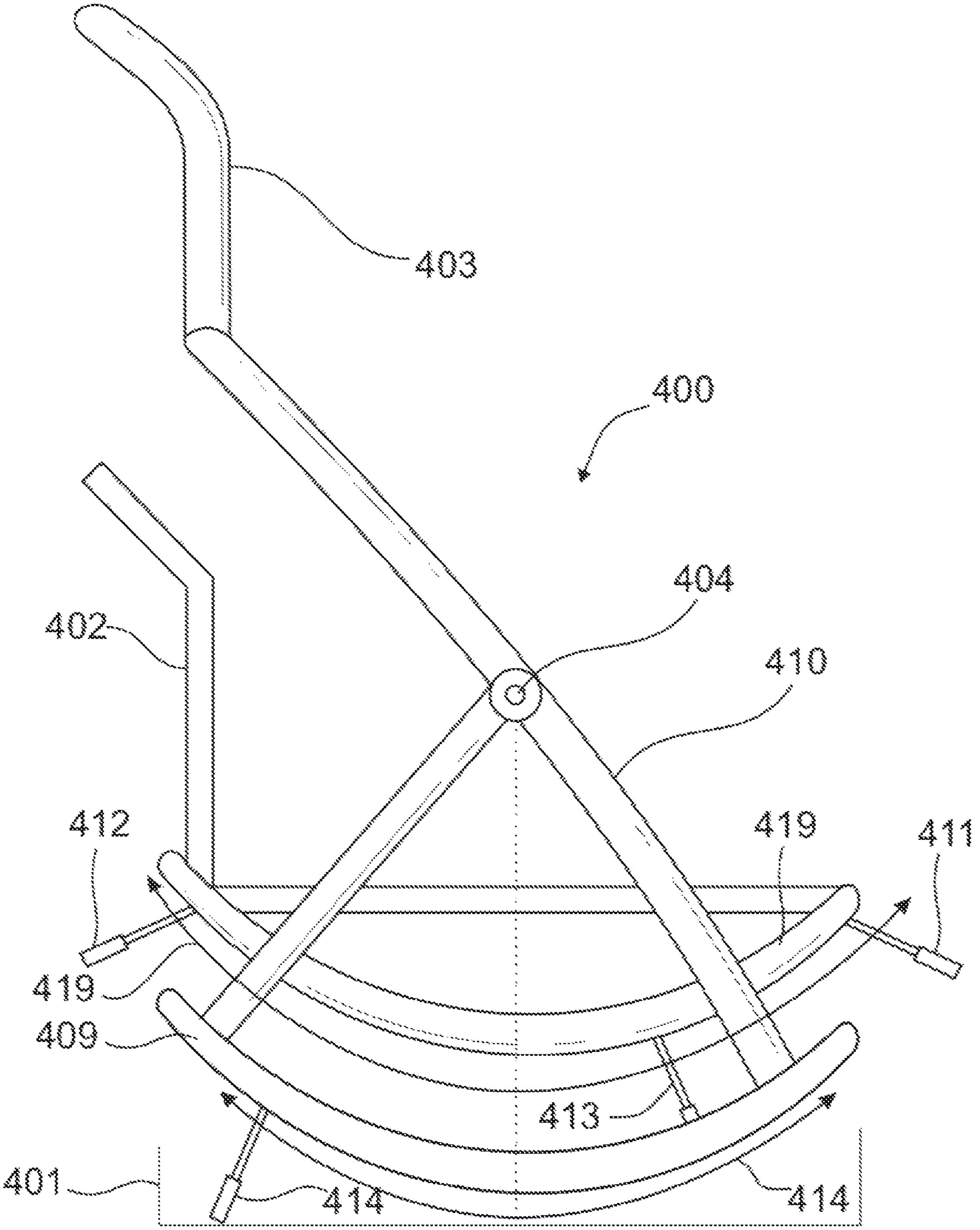
FIG. 4 illustrates an embodiment of a seating assembly with guiding rails in accordance with the invention.

FIG. 4 illustrates an embodiment of a seating assembly 400 with guiding rails 409, 419 in accordance with the invention. The back-support unit 403 is directly connected with the trochanter point 404, while the back-support frame

410 is connected with a circular guiding rail 409 embedded in the seat base unit 401 and having its circle centre in the trochanter point 404. The seat unit 402 is connected with another circular guiding rail 419, also having its circle centre in the trochanter point 404, and being embedded in the seat base unit 401. The guiding rails 409, 419 are provided with dampers or actuators 411, 412, 414—or another type of motion control means—at the front and at the back. Between the two guiding rails 409, 419 a further damper or actuator 413 is provided for controlling movement amongst each other, or fixing them together in a locked position such that seat unit 402 and back-support unit 403 are moving together as one entity. All other dampers or actuators 411, 412, 414 can also be open or locked in different sequences. For a particular embodiment based on the concept of the seating assembly 400 of FIG. 4, a chair with swing function could be presented. Especially in medical or healthcare applications, multiple variations of such swing chair could be very useful, such as e.g. provided with variable damping, all or not using electrical actuators, for patients with spasticity, or for anxious or agitated people.

Figure 5A:
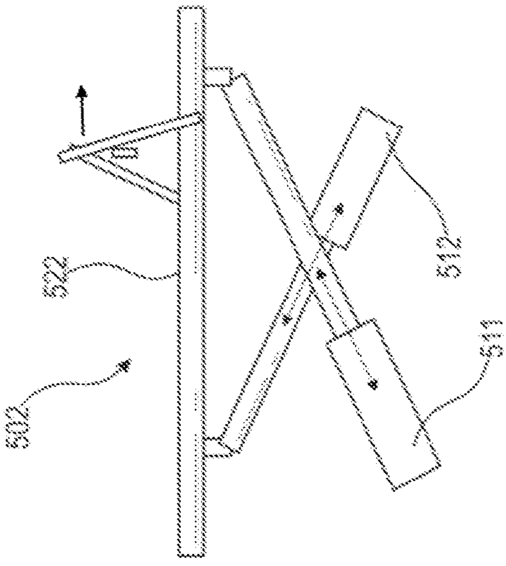
FIGS. 5A and 5B show an embodiment of a seating assembly's gas springs set-up in accordance with the invention.
Figure 5B:
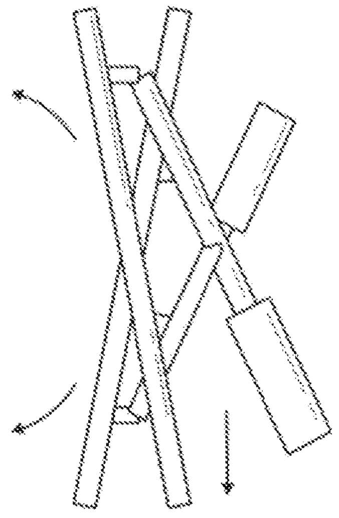

Referring back to the use of gas springs as possible motion control means, FIGS. 5A and 5B show a specific embodiment of a seating assembly's gas springs set-up in accordance with the invention. Gas springs 511, 512 are mounted onto the sitting 522 of a seat unit 502 for control pivoting movement of the seat unit 502, or its sitting 522 in particular. In FIG. 5A, the set-up is illustrated without motion, whereas in FIG. 5B, motion simulation is outlined and indicated with the arrows. Virtual pivot point around the trochanter is generated by means of locking gas spring 511 and opening gas spring 512, locking gas spring 512 and opening gas spring 511, herewith controlling seat unit 502 tilt. A seat unit 502 tilt can be fixed in a particular position by locking both gas springs 511, 512.

Figure 5C:
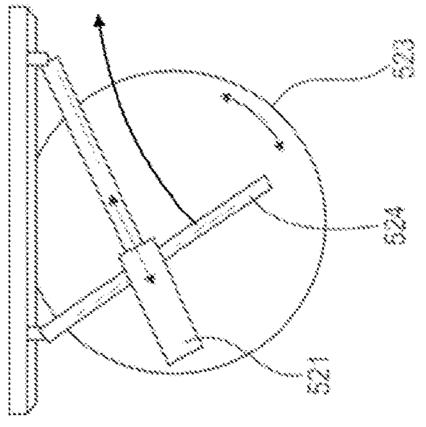
FIGS. 5C and 5D show an embodiment of a seating assembly's gas spring in combination with rotating rod for connecting a seating assembly's seat unit with hip joint in a virtual way in accordance with the invention.
Figure 5D:
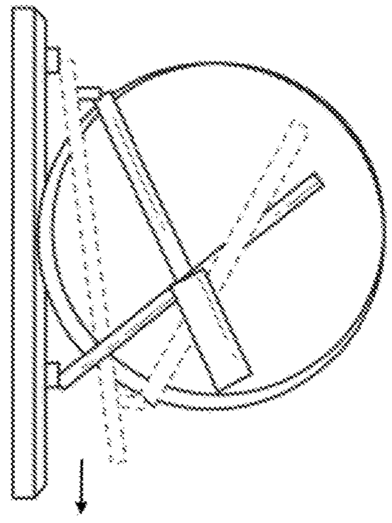

In comparison, FIGS. 5C and 5D illustrate an embodiment of a seating assembly's gas spring 521 in combination with rotating rod 524 following the circular shape 523 with one of its ends, whereas the other end is attached to the sitting 522 of the seat unit 502. A seating assembly's seat unit 502 is here connected with hip joint in a virtual way in accordance with the invention, meaning that a virtual pivot point around the trochanter is generated. While controlling seat base tilt positions, in FIG. 5C, the set-up is illustrated without motion, whereas in FIG. 5D motion simulation is outlined and indicated by the fuzzy and overlapping images. The motions of gas spring set-up on one hand and of the hybrid set-up on the other hand are comparable, i.e. similar motion curves are generated for the two examples given. Similar mechanisms as described in FIGS. 5A-5D can apply to the back-support unit (together with seat unit 502 or separated).

Figure 6D:
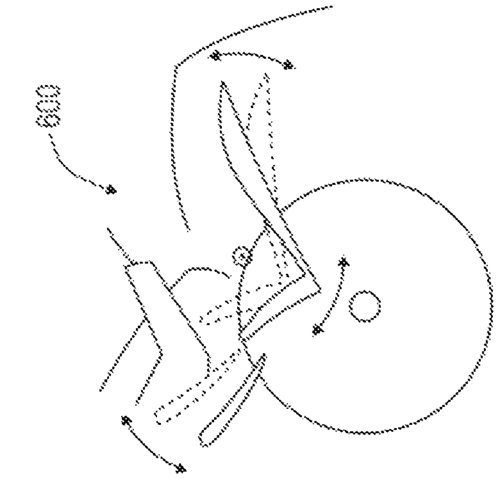
FIGS. 6A, 6B, 6C, and 6D illustrate schematically an embodiment of a wheelchair in accordance with the invention, and its possible movements depicted separately (FIGS. 6A, 6B, and 6C) or all together (FIG. 6D).
Figure 6C:
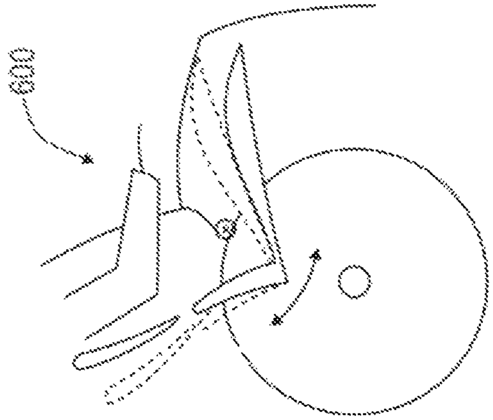
Figure 6B:
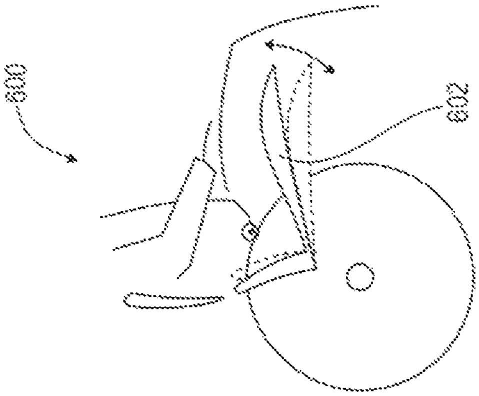
Figure 6A:
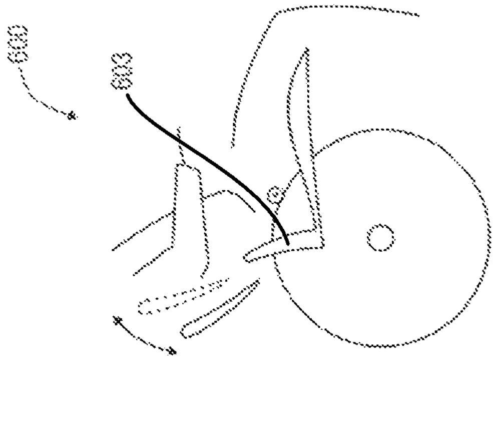

According to an embodiment of the invention, a wheelchair as a seating assembly 600 is considered in FIGS. 6A-6D illustrating schematically possible movements of such (wheel) chair. First, as depicted in FIG. 6A the inclination angle of the back-support unit 603 can be adapted when a person sitting in the wheelchair is reclining. The seat unit 602 can be tilted up or down separately or independently from the back-support unit 603, being displayed in FIG. 6B. Having the back-support unit 603 e.g. fixed to the seat unit 602 by means of third motion control means 113 as mentioned in FIG. 1A, both can be pivoted together as one single unit, which is shown in FIG. 6C. In FIG. 6D all possible pivoting movements from FIGS. 6A, 6B, and 6C are illustrated together.

According to an embodiment of the invention, existing chairs, or wheelchairs in particular, can be adjusted with a seating assembly in accordance with the invention, by means of a retrofit kit. Amongst the existing chairs in general, no limitations are considered, nor are particular types excluded. The method for installing such a retrofit kit for a seating assembly in accordance with the invention can be as follows:

- Removing the back and sitting part out of the existing wheelchair;
- Mounting a bracket on the existing frame to create a rotation point at the level of the hip joint;
- Adding a seat unit (horizontal seat+the pelvis part) and allowing it to move directly or indirectly around the rotation point. Optionally, the existing sitting part can be converted by adding a pelvis part (by means of a bracket);
- Placing an actuator that controls the movements of the seat unit (see different types and movement options as elsewhere mentioned with the invention, e.g. with the description of FIGS. 1A-1E);
- Placing a lumbar and dorsal back section that can also move directly or indirectly around the rotation point. Optionally, the existing back can be converted by removing a part of the back such that only lumbar and dorsal back part remains, while creating a connection by means of a bracket that connects the back part to the pivot point;
- Placing an actuator that controls the movements of the back unit (see different types and movement possibilities as elsewhere mentioned with the invention, e.g. with the description of FIGS. 1A-1E).

The retrofit kit can include a conversion of the seat unit and/or the back-support unit (for different heights) and/or a may provide in a partial segmentation of the seat unit, such as for instance ⅓ back seat and pelvic area, and ⅔ front seat. Moreover, the kit can be extended to an asymmetrical setting of the seat and/or back-support unit by means of actuators that are individually adjustable on the left and right. Asymmetrical setting for seat and/or back-support unit may enable for correction or adjustment in seating comfort of either left or right body parts in answer for instance to people suffering from scoliosis. Moreover, the kit can also comprise of a further segmentation of the front part (half to ⅔ of the front seat) of the seat unit movable around the same hip joint pivoting axis as used generally for seat unit and back-support unit in accordance with the invention, and hence offering more hip bending and stretching to be steered and controlled with actuators.

Different types of actuators could be applicable, while referring e.g. to those gas springs or electrically driven actuators as yet mentioned above. This should also be possible separately and independently of one another on the left and right to offer solutions for people with a hip disability or for enabling standing function. It is noted that the segmentation as described here for the particular application or embodiment of a retrofit kit is in fact to be also interpreted for a seating assembly in general in accordance with the invention, and thus no limitation in type of chair, retrofit or not is to be considered.

According to an embodiment of the invention, a wheelchair with seating assembly is now described with possible movements in either symmetric or asymmetric operation. It is noted that such seating assembly with different possible movements could also be applicable for other types of chairs such as for example an ergonomic chair, a vehicle chair, a design furniture chair. While referring to the seating assembly 700 of FIGS. 7A and 7B, more in particular FIG. 7A, a first movement indicated by the arrow M1 is determined at the height of the backrest 708 of the back-support unit 703. The arrow M1 indicates that the backrest 708 can be moved forward or backward. The back-support unit 703 and its backrest 708 can be further segmented into a back left part 703L. 708L and a back right part 703R, 708R respectively.

Figure 7B:
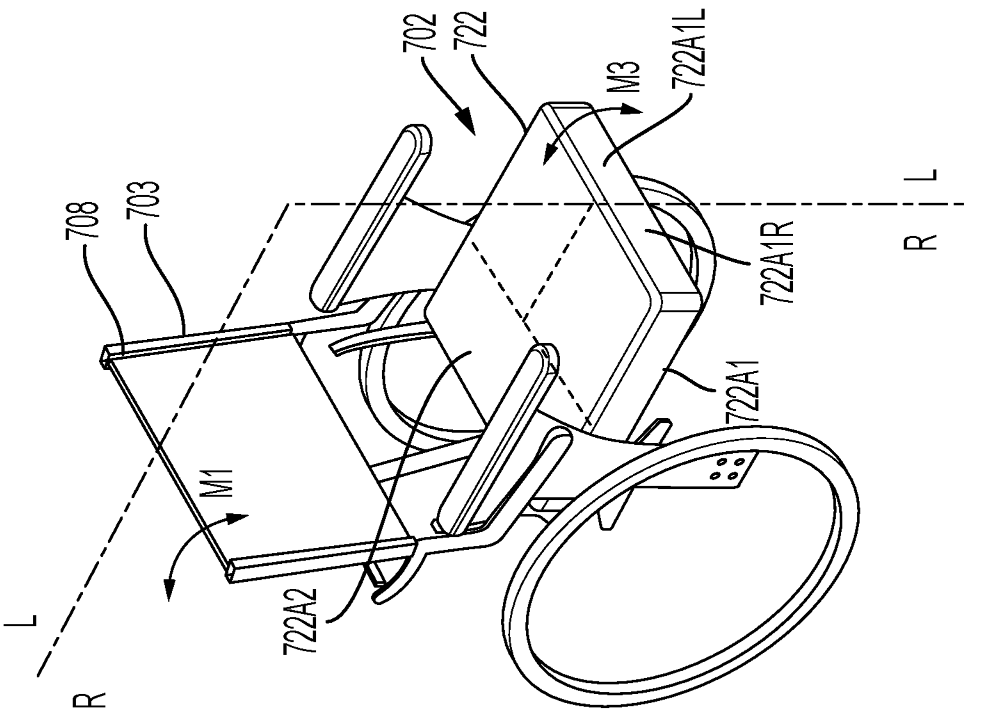
FIGS. 7A and 7B illustrate an embodiment of a wheelchair comprising a seating assembly in accordance with the invention and given in back perspective view (FIG. 7A) and in front perspective view (FIG. 7B).
Figure 7A:
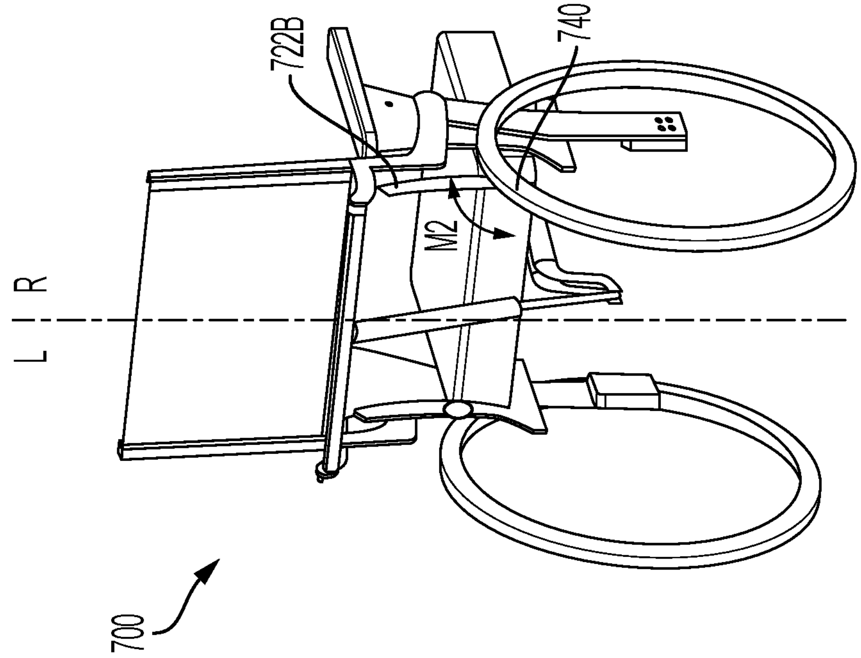

Both in FIG. 7A as in FIG. 7B, a surface or plane is outlined dividing the wheelchair in two identical halves as a left part at the left L from the surface and as a right part at the right R from the surface. Moreover, with such left and right segmentation, the back left and right parts 703L, 708L, 703R, 708R could be controlled separately and independently from each other, such that for example only the back left part 703L, 708L is moved in accordance with the arrow M1, or the back left part 703L, 708L is moved with a different grade than the back right part 703R, 708R, Hence, asymmetric movement is possible, and herewith described of the back parts 703L, 708L, 703R, 708R.

Particularly for healthcare or medical applications asymmetric operation of a chair or wheelchair can be very useful. In fact, independent from the invention, it occurs often in practice that the back-support unit, or the backrest in particular is adapted with additional material to make asymmetric correction, necessary for the patient, possible. Such adaptation can be done e.g. by adding an extra lateral cushioning piece on left or right upper side of the backrest, however, the same idea could also be applicable for lower back parts. With the invention, adding material is no longer needed whereas asymmetric correction or adaptation can be performed by means of installation and control of segmented parts of the seating assembly 700.

Another movement of the seating assembly 700 going along with possible correction for improving seating comfort is determined by arrow M2 as depicted in FIG. 7B. In particular, pelvic correction can be done by means of a stretch band, as commonly known in the art. Such stretch band is specifically present in a wheelchair for instance at the lower back of the wheelchair, just above seat or adjacent to seat. Alternatively, and with reference to the current invention, pelvic correction is also feasible by means of a screw 740, and herewith enabling the lower back 722B moving forward or backward. Moreover, asymmetric movement along M2 for left and right part of the lower back could be possible by independently controlling left and right screw 740L, 740R.

Referring back to FIG. 7A, a further movement is determined with the arrow M3. Whereas the sitting 722, more in particular the horizontal plane or seat 722A of the seat unit 702 can be segmented into a front seat part 722A1 and a back seat part 722A2, the front seat part 722A1 can be moved separately and independently from the back seat part 722A2. The seat 722A is hence divided in two parts. By means of example, these two parts relate to each other as ⅓ and ⅔ of the seat 722A with a front ⅔ and a back ⅓, or as two halves of the seat 722A with a front half and a back half. Other relations amongst these two parts, such as e.g. ⅖ and ⅗ are also covered with the invention. Up or lowering movement of the front seat part 722A1 is applicable as indicated by M3. Such up and lowering movement is for instance made possible and moreover driven by means of an actuator provided at hip joint and connected with the front seat part 722A1. Furthermore, the front seat part 722A1 can be segmented in a left and right part 722A1L, 722A1R to be controlled separately and independently, such that asymmetric operation or correction in seating comfort for left and right leg can be performed. Particularly for people suffering from hemiplegia or partial paralysis e.g. because of a stroke, such asymmetric movement is very much wanted.

The invention claimed is:

1. A seating assembly comprising:
a seat base unit,
a seat unit, and
a back-support unit,
wherein:
both the seat unit and the back-support unit have a common pivoting axis with respect to the seat base unit at a joint level above the seat unit;
the seat unit and the back-support unit are connected to the seat base unit by a pair of opposed pivot points at the joint level and lying on the common pivoting axis at each side of the seating assembly;
the seating assembly further comprises three motion control devices adapted to control a pivoting movement while connecting all of the units with each other;
the three motion control devices comprise a first motion control device, a second motion control device, and a third motion control device, each motion control device being provided in either an open position or a locked position;
the first motion control device is adapted to control:
a pivoting movement of only the seat unit with respect to the seat base unit; and
a pivoting movement of the seat unit and the back-support unit with respect to the seat base unit;
the second motion control device is adapted to control:
a pivoting movement of only the back-support unit with respect to the seat base unit;
the third motion control device is adapted to control:
a pivoting movement of the seat unit with respect to the seat base unit while the back-support unit is in a fixed position; and
any of the pivoting movements is enabled by a force exerted on the seating assembly.

2. The seating assembly of claim 1, wherein any of the first motion control device, the second motion control device, or the third motion control device comprises a gas spring, a damper, or an actuator.

3. The seating assembly of claim 1, wherein at least one end of any of the first motion control device, the second motion control device, or the third motion control device lies on a respective radius of a circle having a center at the joint level for each point of the pair of opposed pivot points or is parallel with the respective radius.

4. The seating assembly of claim 1, further comprising guiding rails in the seat base unit for further controlling the pivoting movement.

5. The seating assembly of claim 1, wherein the pivoting movement of the seat unit and the back-support unit can be independently made, or the seat unit and the back-support unit can be pivoted in a combined manner, or the seat unit and the back-support unit can be temporarily excluded from being pivotable by locking one of the motion control devices.

6. The seating assembly of claim 1, wherein the seat unit and the back-support unit are pivotable forward or backward around the common pivoting axis with respect to the seat base unit.

7. The seating assembly of claim 1, wherein the back-support unit comprises a backrest at an angle with a normal axis perpendicular to a floor platform or to the ground.

8. The seating assembly of claim 1, wherein the joint level is from 3 cm to 20 cm above the seat unit.

9. The seating assembly of claim 1, wherein the joint level is from 5 cm to 15 cm above the seat unit.

10. An ergonomic chair comprising a seating assembly according to claim 1.

11. A wheelchair comprising a seating assembly according to claim 1.

12. A seating assembly comprising:

a seat base unit, a seat unit, and a back-support unit, wherein:

both the seat unit and the back-support unit have a pivoting axis with respect to the seat base unit;

the seat unit and the back-support unit are connected to the seat base unit;

the seating assembly further comprises three motion control devices adapted to control pivoting movements while connecting all of the units with each other;

the three motion control devices are respectively provided, in either an open position or a locked position, between the seat base unit and the seat unit, between the seat unit and the back-support unit, and between the seat base unit and the back-support unit;

the pivoting movements are chosen from:

a pivoting movement of only the seat unit with respect to the seat base unit;

a pivoting movement of only the back-support unit with respect to the seat base unit;

a pivoting movement of the seat unit and the back-support unit with respect to the seat base unit; or a pivoting movement of the seat unit with respect to the seat base unit while the back-support unit is in a fixed position; and any of the pivoting movements is enabled by a force exerted on the seating assembly.

* * * * *